United States Patent Office 3,145,707
Patented Aug. 25, 1964

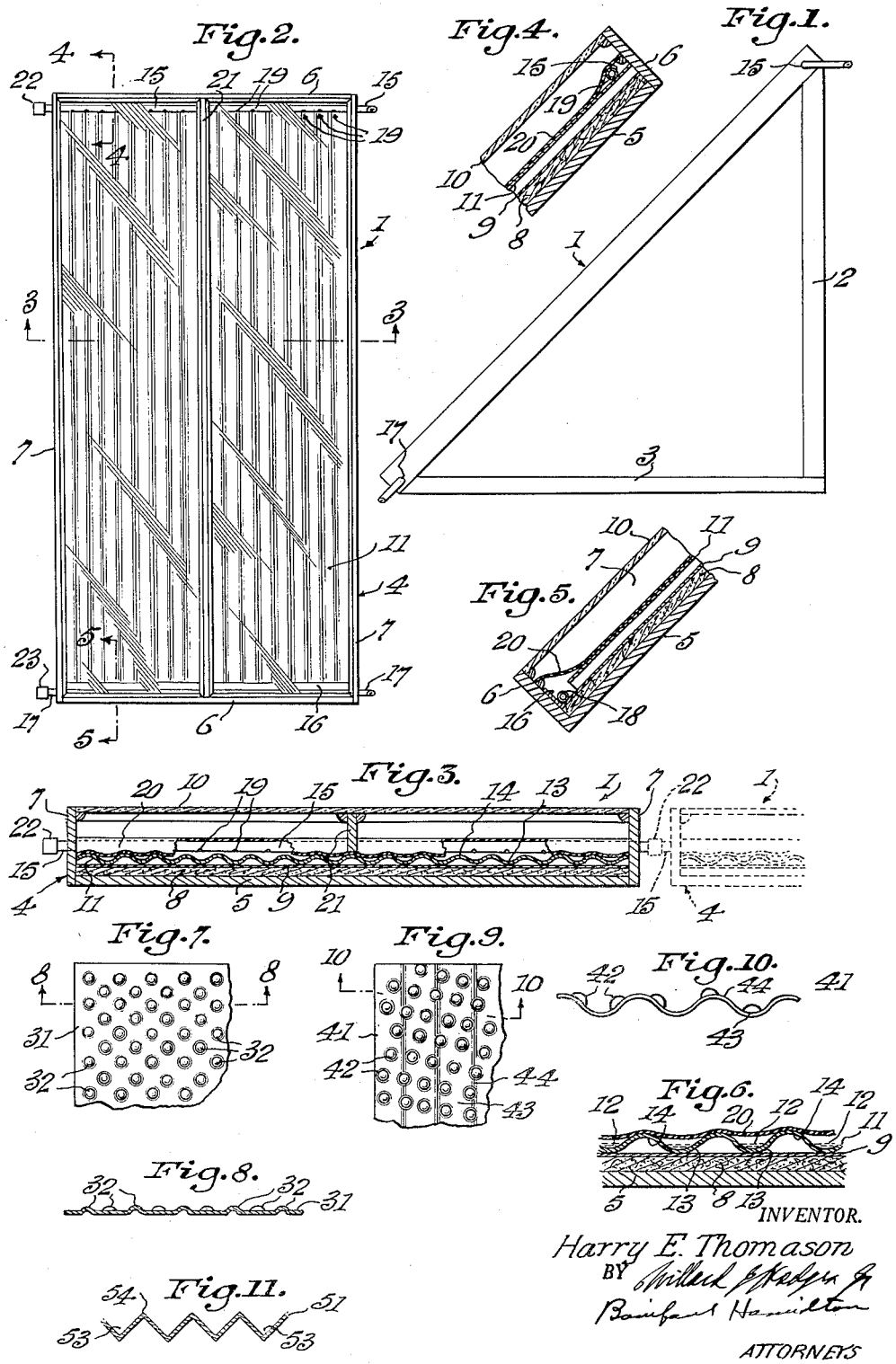

3,145,707
SOLAR HEAT COLLECTOR
Harry E. Thomason, 6911 Walker Mill Road SE.,
Washington 27, D.C.
Filed Apr. 25, 1958, Ser. No. 731,064
4 Claims. (Cl. 126—271)
(Granted under Title 35, U.S. Code (1952), sec. 266)

The invention described herein may be manufactured and used by or for the Government for governmental purposes without the payment of any royalty.

The present invention relates to improvements in solar heat collectors, and particularly the type that may be used both for collecting heat from solar radiation and for dissipating heat when not receiving solar heat, such as at night, or by turning the heat collector (dissipator) away from the sun.

Among the various known heat collectors are structures employing a black insulating base, a glass cover spaced an inch or so thereabove, and black fluid-carrying piping between the glass and the black base, which are used effectively in southern areas of the United States for heating water. These devices are sometimes constructed with the fluid-carrying piping zig-zagging in convolutions in a plane requiring many flow-restricting elbows and many lineal feet of piping per hundred square feet of collector surface, and resulting in very expensive construction as a result of both the cost of the piping and the labor cost. Inefficiencies also result from excessive spacing of the convolutions which permits radiation of much of the solar heat back to the atmosphere. Alternatively, these devices are sometimes constructed in saidwich fashion with the heat collecting fluid running between spaced metal sheets which may be parallel or crimped in imitation of tubing, but still require excessive amounts of copper and labor and still have a high ratio of fluid to heat absorbing metal.

Other existing solar heaters employ light and heat condensing lenses or reflectors to concentrate and localize the sun's light and heat, but such lenses or reflectors are extremely expensive, especially when it is desired to collect solar heat from an area of several hundreds of square feet.

A further type of existing solar heater has the heat conducting fluid contained directly between the insulated base and the transparent cover, or between a black metal heat collector and the transparent cover, in such a way that the transparent cover also constitutes one wall to a fluid container. This construction is not only expensive but lends itself readily to trouble because a broken or loose transparent cover, usually glass, permits the heat conducting fluid to be leaked or spilled, rendering the device inoperative. Therefore, this type device requires expensive and troublesome liquid sealing for the base, sides, and edges, and for the transparent top. Since areas of hundreds of square inches are involved, the glass used must be sufficiently thick and free of flaws and the glass retaining means must be sufficiently strong to withstand contained pressures of two to ten pounds per square inch over fairly large panes.

Many other types of solar heating devices are known, but with limitations and disadvantages so as to render them impractical except for very limited and specialized applications. Most of the solar heaters are very ineffective and practically worthless for dissipating heat, and are therefore not reversible in operation.

The present invention, directed to obviating many of the limitations of the solar heaters described, simplifies and lowers the cost of construction, raises efficiency and is substantially trouble-free in use and operation. Additionally, the present device is readily adaptable to use as a heat-dissipating device to permit service where it is desirable to alternately collect heat and dissipate heat.

Another object of the invention is to provide an improved solar heat collector having a low ratio of heat-absorbing fluid to area of surface exposed to solar radiation so as to obtain a maximum temperature rise. However, if a great quantity of heat is desired with a low rise in temperature, adjustment may be made merely by flowing a larger quantity of heat absorbing fluid through the heat collector.

Other objects and advantages of the invention will be apparent as the description proceeds and the features of novelty will be pointed out in particularity in the appended claims.

Briefly, in accordance with this invention, there is provided a solar heat collector including solar heat collector units which may be used singly or in multiples. The units may be mounted on any movable support as, for example, one designed to permit tracking of the sun, or may be mounted on a fixed structure or built into the roof of a building. When the present invention is constructed into a roof, it becomes the roof, is permanent in character, and saves the cost of providing conventional roofing. The heat collector roof also provides insulation for the building, saving part of the insulation costs of the building. Generally, the units include a box with a transparent protecting cover, a layer of insulation on the interior bottom of the box covered by a layer of reflecting foil and a heat collecting metallic sheet having an irregular and blackened upper surface supported by the foil. The heat collecting sheet is preferably covered by a second transparent cover intermediate the sheet and protecting cover, the intermediate cover preferably being flexible and installed so as to droop against the heat collecting sheet. The device is also provided with a fluid system including a distribution pipe at one end of the box having small ports regularly spaced along its length and a fluid trough parallel to the pipe at the other end of the box so that fluid may be introduced through the pipe to be discharged to run in small quantities along many paths across the heat collecting sheet under the intermediate flexible transparent cover and into the trough. This arrangement provides for a low ratio of volume of fluid to area of heat collecting sheet and for an even distribution of the fluid volume to unit area of heat collecting sheet. The invention also provides modified heat collecting sheets providing various means of controlling the paths of the heat absorbing fluid to provide for the best absorption of heat from the collecting sheet.

In the accompanying drawings, illustrating preferred embodiments of the improvements comprising the invention—

FIG. 1 is an end elevation showing the general configuration of a complete solar heat collector;

FIG. 2 is a front or face view of a heat collector unit included in FIG. 1 embodying the improvements of the instant invention.

FIG. 3 is a transverse section along the line 3—3 of FIG. 2 showing internal details of the collector unit;

FIG. 4 is a partial vertical section taken on line 4—4 of FIG. 2;

FIG. 5 is a partial vertical section taken on the line 5—5 of FIG. 2;

FIG. 6 is an enlarged fragmentary transverse section of a solar heat collector unit showing the details of features appearing in FIG. 3;

FIG. 7 is a fragmentary plan view of a modified heat collecting sheet;

FIG. 8 is a section of the heat collecting sheet substantially on the line 8—8 of FIG. 7;

FIG. 9 is a fragmentary plan view of a further modification of the heat collecting sheet;

FIG. 10 is a section of the heat collecting sheet taken susbtantially on line 10—10 of FIG. 9; and FIG. 11 is a fragmentary section of a still further modification of the heat collecting sheet.

Referring more specifically to the drawings, a complete, self-supporting solar heat collector is illustrated in end elevation in FIG. 1 wherein the heat collector unit 1 is supported by frame members 2 and 3 at an inclination of approximately 45°, an attitude adapted to, but not necessarily the most efficacious for, the receipt of solar radiation. The unit 1 is also adaptable to mounting on a pedestal or other mount having mechanism, either hand operated or power driven, for tracking the sun to gain the maximum solar radiation or to turn the unit away from the sun when the unit is used as a radiator.

The structural details of the solar heat collector unit 1 are best illustrated in FIGS. 1 through 6. The unit 1 proper is contained by box 4 having bottom or base 5, end walls 6 and side walls 7 but no top. The interior of the bottom of the box is covered by a bed of insulation 8 to prevent loss of heat through the bottom. Insulation 8 in turn is preferably, but not necessarily, covered by a sheet of reflecting foil 9 for the purpose of reflecting upwards a maximum amount of the heat reaching it. Box 4 is provided with a transparent cover 10 which will admit solar radiation but minimize heat loss during collection operation not only by its insulating quality of poor heat conduction but also by stopping convection currents and long wave heat radiation from the heated black surface. Although cover 10 is illustrated as glass, any transparent material, preferably one transmitting the full range of the solar spectrum, may be used. Similarly, in some applications of the invention it may be desirable to double the exterior transparent cover or, in other applications, to make the cover removable to enhance radiation when the unit is used to dissipate heat.

The collection of heat in the device is accomplished by a sheet of heat conducting material 11 which has the ability to absorb light energy and convert that energy to heat and the ability to transfer heat so collected to an absorbing fluid medium. If the heat absorbing fluid is a gas, the heat conduction properties of collecting sheet 11 become less significant. The collecting sheet 11 is superimposed on foil 9, or insulation 8 if no foil is used and is preferably polished on its underside, i.e. the side toward the foil, to limit the escape of heat from that underside. The upper surface of heat conducting sheet 11 is preferably treated by any process, as for example painting, to produce a dull black finish or may be treated with a special solar receiving paint which absorbs the sun's rays and converts that radiation to heat while limiting the radiation back to the atmosphere. According to experts in the art, dull black paint will absorb as much as 95 percent of the solar radiation incident upon the surface. A very thin coat of such paint will permit the conducting sheet to readily receive heat for transfer to a fluid heat absorbing medium for ultimate transfer to, and use in, a heat exchanger or other consuming means as, for example, radiators in a building.

In the embodiment of the invention illustrated in FIGS. 2 through 6, conducting sheet 11 is corrugated or otherwise distorted from planar form to a wavelike configuration with curved surfaced hills and valleys running the length of the unit, i.e. from one end wall to the other and parallel to side walls 7. This configuration is particularly efficacious when a liquid is used as the fluid heat absorbing and transferring medium because it permits the liquid to be trickled down the valleys of an inclined sheet 11 in controllable minute quantities with an even distribution of fluid over the area of the collecting sheet. By this controlled means a small quantity of fluid can steadily absorb heat from a large surface of collecting sheet to gain a maximum temperature increase, i.e. to absorb a maximum amount of heat per unit volume. As specifically illustrated in FIG. 6, liquid 12 running in valleys 13 between hills 14 of sheet 11 will absorb heat from the valleys 13 and because of the high heat conductivity of the material of sheet 11, heat will flow from hills 14 to valleys 13 within the conducting sheet. As is obvious from FIG. 6, considerably less fluid is required than would be necessary to provide a constant, although thin, film of liquid over a planar conducting sheet. The canalization of the liquid by the corrugations as it gravitates across the conducting sheet is the most simple method of obtaining a constant predetermined low liquid to area ratio and prevents lateral or crosswise flow which, in the case of a planar configuration, could cause large areas of a heated collecting sheet to escape visit of the liquid thereby reducing the quantity of heat transferred.

As illustrated in FIGS. 2 through 5, the heat absorbing liquid is provided to the unit by a fluid distribution system including distribution pipe 15 at its upper end and trough 16 at the lower end wall 6 which directs the liquid to discharge pipe 17 which protrudes through side wall 7 at 18 to provide for conveyance of heated liquid from the unit. Distribution pipe 15 is provided with a plurality of ports 19 spaced so as to locate one port, or a constant number of ports, at each valley of corrugated conducting sheet 11. Rate of flow and distribution of the liquid may be controlled by adjustment of the size of pipe 15, size of ports 19, number of ports, valving in pipe 15 and by any pressure or pump arrangement used with a completed solar heating system. Since solar heaters operate only when heat is available from the sun, the pump or other pressure apparatus supplying fluid to the distribution pipe may be actuated thermostatically to cut on when heat is available and to cut off when sunshine fails due to sundown or clouds.

Preferably an interior or inner transparent sheet or cover 20 is used intermediate the heat collecting sheet 11 and the cover 10 to reduce uncontrolled reradiation and convection currents and to decrease the undesired effects of vaporization of the liquid used. This inner cover 20 may be of rigid or flexible material resistant to heat and vapor of the fluid, supported in the same manner as cover 10, but it is preferred that inner cover 20 be flexible and loosely secured to the inner portion of walls 6 over the pipe 15 and above trough 16 as illustrated in FIGS. 4 and 5 so as to droop onto the raised portions of collecting sheet 11. This preferred installation of the inner cover 20 reduces the volume of the atmosphere adjacent the collecting sheet 11 limiting the amount of water vapor that can exist in that atmosphere and thereby establishing a maximum quantity of heat that can be lost or suspended by vaporization of the heat absorbing liquid. The cover 20 may, however, be stretched and secured to the raised portions of collecting sheet 11 by an adhesive or by heat sealing to prevent bulging or flapping.

If it is desired to use a gas as the heat absorbing fluid, the fluid distribution and collection systems are reversed to be in accord with the physical fact that a heated gas will travel upwards.

As illustrated in FIGS. 2 and 3, a central supporting member or spacer 21 is used to give additional support to transparent cover 10. In the embodiment using a drooping flexible inner cover 20 as illustrated, spacer 21, by being placed on top of the inner cover 20 and supported by a ridge 14 of the corrugated collecting sheet, also serves to keep the inner cover 20 close to the sheet 11. The existence or frequency of use of spacers 21 obviously depends on the dimensions and material in a particular embodiment of the invention. If the invention were to be used in a non-portable or non-tracking form, such as for the roof of a building the most simple construction might consist of one very broad unit including several spacers 21 as needed for support of cover 10. However, spacers 21 may be omitted completely to avoid shading in early morning and late afternoon, or horizontal spacers may be used to support transparent cover 10 if the shading is critical, since horizontal spacers will shade less of the collector surface. However, smaller units may be made for plurality use to facilitate prefabrication and transportation to installation location. For this reason, the embodiment of FIGS. 2 and 3 are provided for interconnecting fluid supply components enabling units to be "plugged together" as illustrated by the additional dotted line unit of FIG. 3. Distribution pipe 15 is provided with a female connector 22 on one side while the return system is provided with an additional pipe 17 and a female connector 23.

A first modification of the heat collecting sheet is illustrated in FIGS. 7 and 8. Here collecting sheet 31 which has the same requirements as sheet 11 as to characteristics of light absorption, heat collection and heat conduction, accomplishes the liquid distribution objective of the invention by use of a different surface configuration. Sheet 31 is basically planar but is embossed so as to provide bosses 32, illustrated as, but not necessarily, regularly spaced constituting hills separated by interconnecting valleys. In this modification, the bosses 32 provide the "dry area" used to reduce the liquid volume to surface area ratio forming an important object of the invention. Flow of the liquid along the tortuous path dictated by the bosses causes a retardation of flow providing for a higher temperature increase of the liquid. As described with reference to FIG. 3, one or more transparencies may be used. If two transparencies are used, the bosses may support the inner transparent cover 20 slightly raised above the main heat-collecting sheet. The bosses inherently help to keep the fluid flowing in small streams and distributed in the valleys, rather than permitting them to congregate into large streams at some areas with no water flowing over other areas. As can be seen in FIG. 7, these valleys constitute a larger percentage of the collecting sheet than do the valleys of the modification of FIG. 3. In this modification thin passageways are held open between the heat-collecting sheet 31 and the transparent cover 20 so that liquid, or gas, to be heated can flow through these passageways. Thus, if water is used as a heat transfer fluid, it can readily drain out with its "load of heat" when the apparatus stops for the night, rather than remain entrapped in the collector to get cold or to freeze and cause damage.

When the embossed projections are of only slight extent it is obvious that the transparent cover resting on the tops of the projections is spaced only slightly from the valleys of the collecting sheet. Thus, the gas or liquid flowing between the collecting sheet and transparent cover inherently is held to very small dimensions. If the bosses are high, and if the fluid flowing therebeneath is liquid, the liquid does not contact the transparent cover, but the bosses still help to retard the flow and to distribute the liquid more uniformly in the valleys of the heat-collecting sheet.

Further, since the bosses help keep the cover 20 from direct total contact with the valley parts of the collecting sheet, they help minimize damage to the cover due to extremely high temperatures of the collecting sheet when the collector is not operating, such as on a hot summer day. As described with respect to FIG. 3, the inner cover may be rigid or flexible. If it is a flexible transparency, the embossing helps keep it from sticking to the valley parts of the heat-collecting sheet and thus assures free passage of the fluid. Furthermore, the embossing increases the strength of the collecting sheet itself and thus makes it possible to use a lighter weight, less expensive heat-collecting sheet while retaining the desired strength. Additionally the embossing makes it possible for the sheet to expand and contract within itself as the temperature rises and falls, thus minimizing the tendency for the sheet to buckle and warp. From the economic point of view, commercially available embossed sheet metal generally costs the same price as the flat sheet, even if the thickness is the same; and it is less expensive if the sheet is thinner. Thus, the embossed form provides many advantages.

Another modification is illustrated in FIGS. 9 and 10 wherein sheet 41, of the same characteristics with regard to heat as sheets 11 and 31, is both corrugated and embossed, having bosses 42, valleys 43, and ridges 44. Again, for the purposes of illustration, the bosses are arranged in regular pattern but may be located at random. In this arrangement a tortuous path within each valley is provided for the liquid gaining both advantages viz: canalization and impediment of flow.

Still another modification is illustrated in FIG. 11 where sheet 51 is ararnged in a plurality of angularly disposed valleys 53 and ridges 54 by a crimped configuration. This modification has the capability of presenting planar surfaces to the solar radiation and thereby decreasing, on the average, the angles of incidence of the radiation; or as the angle of incidence increases, the configuration provides for the reflection of any deflected portion of the ray onto the opposing side of the valley rather than back to the atmosphere.

With the use of structure according to this invention, approximately 95 percent of the sun's rays reaching the collector are converted to heat, and a very large percentage of this heat is transferred to the fluid and immediately taken to the point of use or storage. If higher temperatures of the water are desired, it is merely necessary to increase the length of travel of the liquid through the valleys, i.e. to increase the length of the unit from top to bottom, to decrease the rate of flow, or to introduce the fluid intermittently, e.g. to cause the fluid to flow for a few minutes and not to flow for a few minutes.

In certain instances the insulating material may be dispensed with or minimized, for example, if the solar heater unit is constructed as a portion of the roof of a building, the insulation of the roof may serve a dual function.

The unit will dissipate heat readily when operated at night or turned away from the sun, and is particularly effective when any transparent covers are removed from above the heat collecting sheet. Heat dissipation is great in this use because of evaporation of water flowing down the collecting sheet utilizing the principle that heat of vaporization absorbs tremendous quantities of heat.

The present invention has numerous advantages such as simplicity of construction, low cost, and high efficiency. It is substantially trouble-free in operation. The liquid automatically drains from the heater as soon as it is turned off and thereby avoids freezing in cold weather. No liquid-tight joints are necessary among the frame members. A wavelike, corrugated, embossed, or raised projection heat conductor material is very inexpensive to manufacture and light-weight to transport. The sun's rays usually strike substantial portions of the corrugated surface at small angles of incidence, even if the sun is to the left or right of a line normal to the surface. Thus, even a stationarily mounted unit is very efficient in absorbing light.

Since no part of the heat-collecting surface is very far from the heat-collecting fluid flowing down the valleys or between bosses, very little heat is radiated back to the atmosphere and the efficiency is extremely high. Even if one outlet of the distribution pipe should become clogged, the others continue to function and efficiency is only insignificantly impaired.

The present structure is also very effective when used to heat a gas since the corrugated surface has more square inches of exposed surface than a flat member providing greater metal-to-gas contact and therefore greater heat transfer.

In some installations the wavelike formation may be more pronounced, as channeled or crimped. Such form is particularly advantageous in adjustable collectors since the deep valleys or crimping keep the liquid flowing in closely spaced paths, even if the collector is tilted sidewise.

The present construction substantially eliminates the problem of condensation of liquid on the transparent material, experienced in many heat collectors. In addition to the action of inner cover 20, the higher temperatures remain at the lower end of the collector (when a liquid is used) and this high temperature keeps the glass or other transparent material warm enough to prevent condensation. At the upper end, where the liquid flowing in is colder, there is less evaporation, and the transparent material is warm enough that very little condensation is experienced. In some forms of the invention the condensation is more pronounced. However, this condensation usually forms small droplets of liquid which act as tiny magnifying lenses and "bend" the light rays as they pass through the droplets. A high percentage of the sunlight is thus transmitted to the heat-collecting sheet and the amount of reflection away due to condensation is not nearly as great as had been anticipated by some authorities. Whether one, two, or more layers of transparent material are used, condensation and reflection due to condensation is at a minimum.

It is to be understood that the embodiment of the invention with its modifications as illustrated and described is a preferred example and that various changes may be resorted to, or incorporation of many features old in the art may be resorted to, without departing from the spirit of the invention or the scope of the appended claims.

I claim:

1. In a solar heat collector having an insulated base, a heat-collecting sheet mounted on the base, transparent cover means above and in close proximity with the heat-collecting sheet, means for uniformly distributing fluid to and retrieving fluid from said sheet, and supporting and securing means holding the elements in predetermined relationships, the improvement wherein the heat-collecting sheet is distorted to present an irregular surface having raised portions spaced uniformly across said sheet, the means for distributing the fluid has a regularly spaced plurality of fluid discharge ports along an end of the heat-collecting sheet, said transparent cover means includes a transparent outer protective cover substantially parallel to said sheet and a transparent inner flexible cover loosely secured to said supporting and securing means over said means for distributing fluid and drooping toward a position of contact with said raised portions but not extending to the depressed surfaces of said irregular surface of the heat-collecting sheet and fluid distributed to said sheet is restricted to flow between said raised portions and beneath said transparent inner flexible cover.

2. A device for collection of heat from solar radiation and for radiation of heat comprising an insulated base; an inclined distorted and irregular surfaced heat collecting sheet having raised portions spaced uniformly across said sheet, said sheet having an upper end and a lower end and superimposed on said base; frame means at the perimeter of and inclosing said base and heat-collecting sheet; an inner flexible transparent cover substantially covering, substantially parallel to and in close proximity with the face of said heat-collecting sheet so situated as to rest on the raised portions of said irregular surface of said heat collecting sheet, an outer transparent cover substantially parallel to and in near proximity with said inner cover; the intervening spaces therebetween being further inclosed by said frame means, fluid distributing means for introducing a fluid across the upper end of said heat collecting sheet to flow between said raised portions and beneath said inner flexible transparent cover, means for collecting said fluid after it has passed over and contacted said heat collecting sheet; and support means for said heat-collecting sheet, said heat insulated base and each of said transparent covers; whereby said fluid flows down said sheet in controllable relatively small quantities with an even distribution of fluid between the raised portions of the collecting sheet; and whereby a small quantity of fluid steadily absorbs heat from a large surface of collecting sheet to gain maximum heat collection by canalization of said fluid, and said inner flexible transparent cover reduces uncontrolled reradiation and convection currents and decreases undesired effects of vaporization of said fluid by reducing the volume of the atmosphere adjacent to said collecting sheet and limiting the amount of vapor that can exist in that atmosphere.

3. A device for collection of heat from solar radiation and for radiation of heat comprising an insulated base, a distorted, irregular-surfaced heat-collecting sheet having raised portions spaced uniformly across said sheet, said raised portions being embossed, the bosses protruding from the upper side of said heat-collecting sheet, said heat-collecting sheet superimposed on said base with said raised portions facing upwardly, frame means at the perimeter of and inclosing said base and heat-collecting sheet, a transparent cover substantially covering and in close proximity with the raised portions on said heat-collecting sheet, the intervening spaces therebetween being further inclosed by said frame means, and fluid distributing means for introducing a fluid for the transfer of heat and for causing said fluid to flow across the irregular surface of said sheet between the raised portions and beneath said transparent cover to effect a heat exchange between said fluid and said sheet, means for collecting said fluid after it has flowed over and contacted said heat-collecting sheet, and support means for said heat-collecting sheet, said insulated base, and said transparent cover.

4. The device of claim 3 wherein each raised portion forms the upper part of a corrugation.

References Cited in the file of this patent

UNITED STATES PATENTS

| 728,392 | Hague | May 19, 1903 |
| 1,889,238 | Clark | Nov. 29, 1932 |
| 1,988,673 | Van Dijck et al. | Jan. 22, 1935 |
| 2,281,754 | Dalzell | May 5, 1942 |
| 2,553,073 | Barnett | May 15, 1951 |
| 2,660,863 | Gerhart | Dec. 1, 1953 |
| 2,680,437 | Miller | June 8, 1954 |
| 2,680,565 | Lof | June 8, 1954 |

FOREIGN PATENTS

| 28,130 | Great Britain | of 1907 |
| 840,926 | France | Jan. 28, 1939 |
| 1,023,132 | France | Dec. 24, 1952 |